United States Patent
An et al.

(10) Patent No.: US 12,510,331 B2
(45) Date of Patent: Dec. 30, 2025

(54) SIGHTING CONTROL METHOD BASED ON HUMAN DETECTION, PRODUCT, DEVICE AND MEDIUM

(71) Applicant: RAYTRON TECHNOLOGY CO., LTD., Yantai (CN)

(72) Inventors: Jiwen An, Hefei (CN); Yang Chen, Hefei (CN); Zhongyin Liu, Hefei (CN); Hao Wang, Hefei (CN); Yinli Jiang, Hefei (CN)

(73) Assignee: RAYTRON TECHNOLOGY CO., LTD., Yantai (CN)

( * ) Notice: Subject to any disclaimer, the term of this patent is extended or adjusted under 35 U.S.C. 154(b) by 0 days.

(21) Appl. No.: 18/935,683

(22) Filed: Nov. 4, 2024

(65) Prior Publication Data

US 2025/0362111 A1   Nov. 27, 2025

(30) Foreign Application Priority Data

May 24, 2024   (CN) .......................... 202410656514.6

(51) Int. Cl.
| | |
|---|---|
| F41G 1/54 | (2006.01) |
| F41A 17/08 | (2006.01) |
| F41G 11/00 | (2006.01) |
| G01P 15/14 | (2013.01) |
| G06T 7/73 | (2017.01) |

(52) U.S. Cl.
CPC ................ *F41G 1/54* (2013.01); *F41G 11/00* (2013.01); *G01P 15/14* (2013.01); *G06T 7/75* (2017.01); *G06T 2207/30196* (2013.01)

(58) Field of Classification Search
CPC ... F41G 1/54; F41G 11/00; G06T 7/75; G01P 15/41; F41A 17/08
USPC ......................................................... 42/70.09
See application file for complete search history.

(56) References Cited

U.S. PATENT DOCUMENTS

| | | | |
|---|---|---|---|
| 10,750,431 B2 | 8/2020 | Juhasz | |
| 11,105,589 B1* | 8/2021 | Bilbrey | ..................... F41G 3/08 |
| 2006/0248777 A1 | 11/2006 | Florence | |
| 2022/0357123 A1* | 11/2022 | Prudent | ................... F41A 19/58 |
| 2023/0037964 A1* | 2/2023 | Mann | .................... F41A 17/066 |

FOREIGN PATENT DOCUMENTS

| | | | | |
|---|---|---|---|---|
| CN | 110770739 A | | 2/2020 | |
| WO | WO-2023152737 A1 * | | 8/2023 | ............... F41G 3/08 |

OTHER PUBLICATIONS

The extended European search report of EP patent application No. 24211483.3 issued on Apr. 4, 2025.

* cited by examiner

*Primary Examiner* — Bret Hayes

(57) ABSTRACT

The application provides a sighting control method based on human detection, a product, a device and a medium. The sighting control method based on human detection includes: acquiring a current scene image in a current field of view of a sighting device; determining whether there is a human target currently being aimed according to a target recognition result of the current scene image and the position of an aiming mark in the current scene image; detecting whether a shooting action occurs if it is determined that there is a target human currently being aimed at; and controlling the sighting device to self-destroy if a shooting action occurs.

16 Claims, 7 Drawing Sheets

S101 — Acquiring a current scene image in a current field of view of a sighting device S103 — Determining whether there is a human target currently being aimed at based on a target recognition result of the current scene image and a position of an aiming mark in the current scene image S105 — Detecting whether a shooting action occurs if it is determined that there is a human target currently being aimed at S107 — Controlling the sighting device to self-destroy if a shooting action occurs

SIGHTING CONTROL METHOD BASED ON HUMAN DETECTION, PRODUCT, DEVICE AND MEDIUM

FIELD

The application relates to the technical field of sighting products, in particular to a sighting control method based on human detection, a computer program product, a sighting device and a computer-readable storage medium.

BACKGROUND

The wide spread and gradual popularization of hunting in different regions all over the world lead to constant pursuit for the performance of shooting equipment, particularly lead to a significant increase in the requirement for shooting accuracy. Sighting devices, as an important component for improving the shooting accuracy of hunting and shooting equipment, can assist shooters in accurately aiming at a target in a real-time image, thus greatly improving the operation ability of the shooters.

The development and application of sighting devices are of great importance for improving the user experience of hunting and shooting equipment. One of the major breakthroughs in the sighting devices is the development and application of infrared scopes, which can collect thermal radiation emitted by a target object and convert the collected thermal radiation into a visual image to allow for shooting under low-light conditions, thus providing good hunting experience for shooters in various environments.

However, the inventor of the application finds in the study that all existing sighting devices are developed and applied to help shooters aim at targets in various application scenarios and neglect the safety of hunting and shooting equipment in use, and particularly, in some dark or unforeseen circumstances, others may be shot or hurt mistakenly. By adding the sighting device to the shooting equipment, such as guns, the shooting equipment can be limited only to civilian use such as hunting, and cannot support for military use. Adding such sighting devices can also provide a safety warning function to the civilian shooting equipment that originally do not have such safety warning function, which is of great significance for improving the safety of the shooting equipment in use.

SUMMARY

The present application is directed to a sighting control method based on human detection, a computer program product, a sighting device and a computer-readable storage medium that can effectively improve the safety of shooting equipment and prevent others from being shot mistakenly.

In one aspect, a sighting control method based on human detection includes: acquiring a current scene image in a current field of view of a sighting device; determining whether there is a human target currently being aimed at based on a target recognition result of the current scene image and the position of an aiming mark in the current scene image; detecting whether a shooting action occurs if it is determined that there is a human target currently being aimed at; and controlling the sighting device to self-destroy if a shooting action occurs.

In a second aspect, the application provides a computer program product, comprising a computer program, wherein the computer program is executable by a processor to implement the sighting control method based on human detection according to any one embodiment of the application.

In a third aspect, the application provides a sighting device, comprising a memory configured to store a computer program therein; a processor configured to execute the computer program to implement the sighting control method based on human detection according to any one embodiment of the application; an image sensor configured to acquire a current scene image in a current field of view and send the current scene image to the processor; and a display module configured to display information in a current sighting mode.

In a fourth aspect, the application provides a computer-readable storage medium, wherein a computer program is stored in the computer-readable storage medium, and the computer program is executable by a processor to implement the sighting control method based on human detection according to any one embodiment of the application.

In the sighting control method based on human detection provided by the above embodiments, with respect to a current scene image acquired in real time in a current field of view of a sighting device, whether there is a human target currently being aimed at is determined according to a target recognition result and the position of an aiming mark. If it is determined that there is a human target currently being aimed at, whether a user performs a shooting action is detected in the process of aiming at the human target. If the shooting action is performed, the sighting device is controlled to self-destroy to be disabled permanently, so as to restrict the user from continuing to use the sighting device for assisting the shooting. In this way, the sighting device provided by the embodiments of the application can only be used by users to carry out shooting activities with the shooting equipment in civilian scenarios, and the shooting equipment cannot be used in military scenarios or other legally prohibited scenarios, thus effectively improving the safety of the shooting equipment in use.

It should be noted that the sighting device can be added, as an accessory, to shooting equipment. Therefore, for any shooting equipment originally having no restrictions in its application scenarios imposed thereon, the sighting device employing the sighting control method based on human detection provided by embodiments of the present application can be added to realize a safety warning function, thus having good adaptability and practicability.

The computer program product, the sighting device and the computer-readable storage medium in the above embodiments belong to the same concept as the embodiments of the sighting control method based on human detection, and can achieve the same technical effects as the embodiments of the sighting control method based on human detection, explanations of which thus will not be repeated here.

BRIEF DESCRIPTION OF THE DRAWINGS

FIG. 4 shows a situation where there is a human target being currently aimed at.

FIG. 5 shows another situation where there is a human target being currently aimed at.

FIG. 6 shows still another situation where there is a human target being currently aimed at.

DESCRIPTION OF THE EMBODIMENTS

The technical solutions of this application are described in further detail below in conjunction with accompanying drawings and specific embodiments.

To better clarify the purposes, technical solutions and advantages of the application, the application will be described in further detail below in conjunction with accompanying drawings. The embodiments in the following description should not be construed as limitations of the application, and all other embodiments obtained by those ordinarily skilled in the art without creative labor should also fall within the protection scope of the application.

The expression "some embodiments" in the following description should be interpreted as a subset of all possible embodiments. It should be noted that "some embodiments" may be identical or different subsets of all possible embodiments, and these subsets may be combined on the premise of no conflicting with each other.

Terms "first", "second" and "third" in the following description are merely used for distinguishing similar items and do not indicate a specific sequence of the items. It can be understood that specific sequences defined by "first", "second" and "third" may be changed where permitted to allow the embodiments of the application described here to be implemented in other sequences different from those illustrated or described herein.

Before the embodiments of the application are described in further detail, terms involved in the embodiments of the application are explained as follows.

Sighting device: the sighting device refers to a tool that is mounted on the shooting equipment to help shooters accurately observe and sight a target. The sighting device generally comprises an image sensor and a display module, wherein the image sensor is used to acquire a scene image within a current field of view, and the display module is used to display the scene image and an aiming mark. The sighting device is typically a stand-alone sighting tool and may be mounted on shooting equipment for use. Of course, the sighting device may be part of the shooting equipment that is integrated and preinstalled on the shooting equipment before delivery of the shooting equipment, that is, the shooting equipment itself has a sighting function and is provided with an image sensor and a display module. In the application, the sighting device may be a stand-alone sighting tool or one that is integrated on shooting equipment, and the application has no limitation in this aspect.

Aiming mark: the aiming mark refers to any mark that is displayed in an image of the sighting device for indicating a currently aimed position, such as, for example, a reticle, an aiming cursor or an aiming red dot. When the aiming mark is positioned on a target in the scene image, it indicates that shooting equipment aims at the target.

Figure 1:
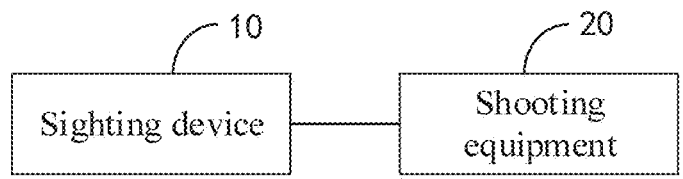
FIG. 1 illustrates a possible application scenario of a sighting control method based on human detection.

Referring to FIG. 1 which illustrates a possible application scenario for a sighting control method based on human detection provided by an embodiment of the application, in this possible application scenario, a sighting device 10 is designed as a separate and independent accessory with respect to shooting equipment 20, and comprises an image sensor, a display module, a memory and a processor. The sighting device 10 may be aftermarket mounted on the shooting equipment 20. The sighting device 10 is loaded with a computer program for implementing the sighting control method based on human detection provided by the embodiment of the application, so as to provide human target detection and warning for the shooting equipment 20 in shooting activities, and the sighting device 10 will self-destroy upon detection of a human target being currently aimed and the occurrence of a shooting action.

Optionally, the sighting device 10 may be integrated on the shooting equipment 20 before delivery of the shooting equipment 20; for users using the shooting equipment 20, the sighting device 10 is preassembled on the shooting equipment 20, but this situation also belongs to an exemplary application scenario where the sighting device 10 can be added as an accessory to the shooting equipment 20, to add the human detection and warning function to the shooting equipment which originally does not have the safety warning function, so that the sighting device 10 will self-destroy upon detection of a human target being currently aimed and the occurrence of a shooting action.

Figure 2:
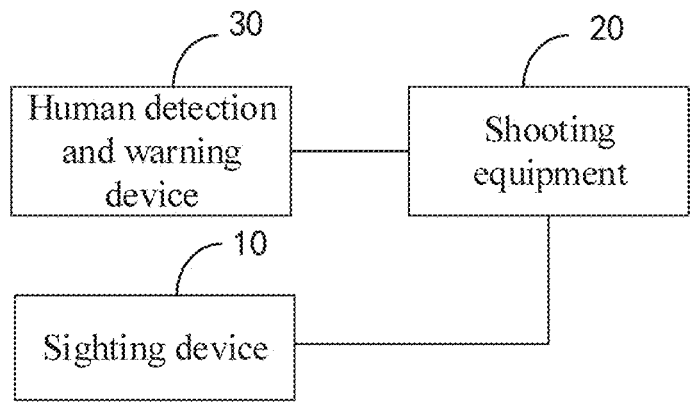
FIG. 2 illustrates another possible application scenario of the sighting control method based on human detection.

Referring to FIG. 2 which is a schematic diagram of another possible application scenario for the sighting control method based on human detection provided by the embodiment of the application, in this application scenario, an independent and separate human detection and warning device 30 loaded with a computer program for implementing the sighting control method based on human detection provided by the embodiment of the application is designed, and in this case, the human detection and warning device 30 comprises a memory and a processor, and the human detection and warning device 30 and an existing sighting device 10 are two independent and separate accessories and work together to implement the sighting control method based on human detection provided by the embodiments of the application. The human detection and warning device 30 may be pre-assembled on the shooting equipment 20 or aftermarket mounted to the shooting equipment, so as to add the human detection and warning function to the shooting equipment which originally does not have the safety warning function. It can be understood that although the human detection and warning device 30 is an independent and separate component, it can also be regarded as part of the sighting device 10.

It should be noted that, in the following embodiments, the sighting control method based on human detection is mainly illustrated as being applied in the sighting device (i.e., the sighting device is the one who performs the method) by way of example, and the sighting device is an independent observation and sighting tool that can be aftermarket installed on the shooting equipment for use, but these examples should not be used to limit the present application.

Figure 3:
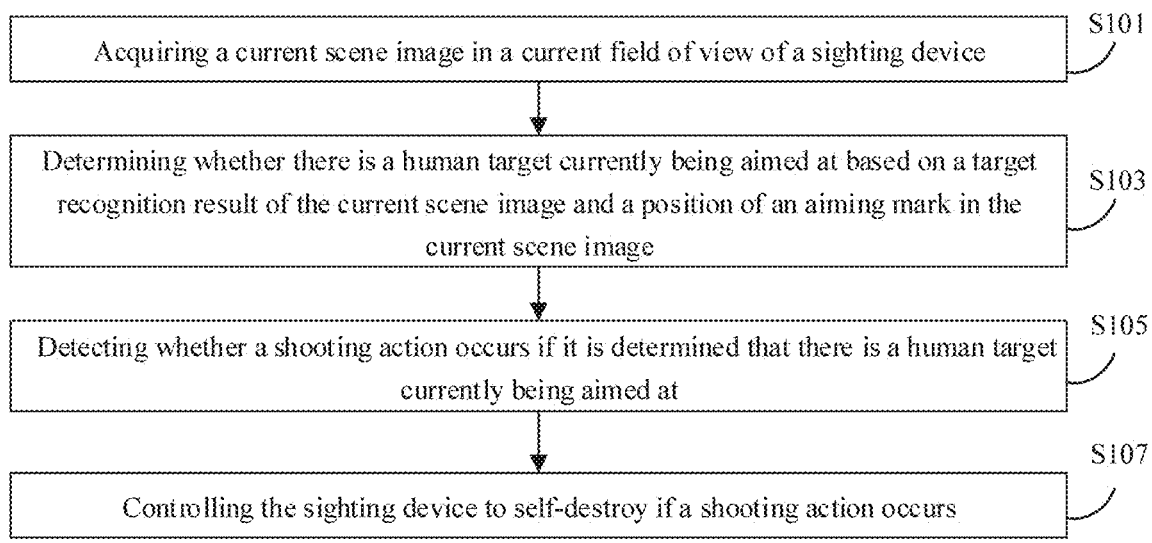
FIG. 3 is a flow chart of the sighting control method based on human detection according to one embodiment.

Referring to FIG. 3, one embodiment of the application provides a sighting control method based on human detection, comprising the following steps:

S101, acquiring a current scene image in a current field of view of a sighting device;

S103, determining whether there is a human target current being aimed at based on a target recognition result of the current scene image and a position of an aiming mark in the current scene image;

S105, detecting whether a shooting action occurs if it is detected that there is a human target currently being aimed at; and S107, controlling the sighting device to self-destroy if a shooting action occurs.

The current scene image refers to the image formed in real time for the current field of view of the sighting device during use. A target refers to an object of interest for image detection in the current scene image, and in embodiments of this application, targets are categorized into an aiming target and a human target. For example, in a hunting scene, the aiming target mainly includes various prey in the hunting scene image. The human target refers to a human body or any part thereof contained in the current scene image.

Target recognition may be carried out by various known methods of image detection to recognize the type and location of a specified target in the image. The sighting control method based on human detection provided by embodiments of the present application may be applied to the sighting device, and specifically may be implemented by a processor within the sighting device by executing a computer program. In the process of performing the sighting control method based on human detection by the sighting device, the human target is taken as one of the objects of interest for image detection in the current scene image, and when it is determined that the shooting equipment is aiming at a human target based on the target recognition result of the current scene image and the position of the aiming mark in the current scene image, it is determined whether a shooting action occurs. If the user performs the shooting action regardless of the human target being aimed at, the sighting device will be controlled to self-destroy so to be disabled permanently. In this way, the sighting device provided by the embodiments of the application can only be used by users to carry out shooting activities with the shooting equipment in civilian scenarios, and the shooting equipment cannot be used in military scenarios or other legally prohibited scenarios, thus effectively improving the safety of the shooting equipment in use.

Determining whether there is a human target currently being aimed at may involve a global target detection and recognition with respect to the current scene image based on target recognition, to recognize and mark all human targets contained in the current scene image. At the same time, based on the position of the aiming mark in the current scene image, it is determined whether the position of the aiming mark overlaps the position of any one of the human targets that have been marked, and it is thereby further determined whether a human target is being currently aimed at.

In another optional embodiment, determining whether there is a human target being currently aimed at may also be performed as follows: the position of the aiming mark in the current scene image is first determined, and a predetermined area image is determined with the position of the aiming mark as a reference position (e.g., the image at a rectangular area with a predetermined size centered on the position of the aiming mark is determined as the predetermined area image), then the target recognition is carried out to determine whether there is a human target within only the predetermined area image corresponding to the position of the aiming mark in the current scene image. That is, a local target detection and recognition is performed with respect to only the predetermined area image in the current scene image, and it is thereby determined whether there is a human target being currently aimed at.

Figure 4:
Figure 5:
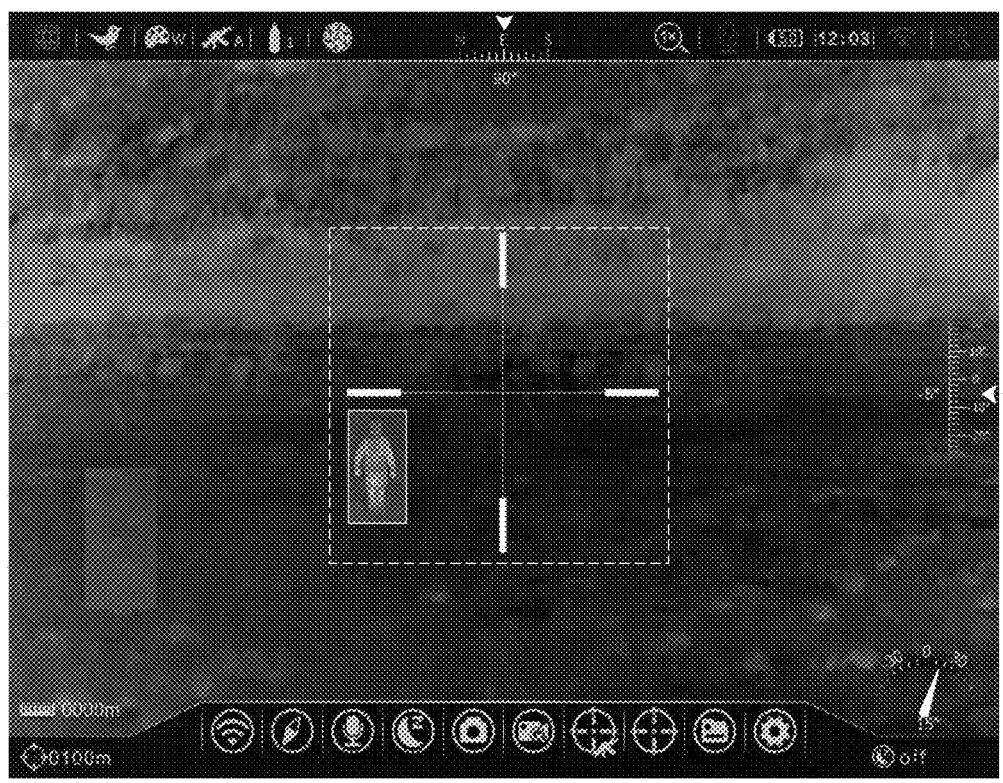
Figure 6:

No matter whether global target recognition or local target recognition is adopted, whether there is a human target being currently aimed at may be determined as follows: as shown in FIG. 4, it is determined that there is a human target being currently aimed at when the position of the human target overlaps with the position of the aiming mark; and as shown in FIGS. 5 and 6, it is determined that there is a human target being currently aimed at when there is a human target present in the predetermined area image corresponding to the aiming mark within a set time.

For those shooting equipment originally having no restrictions in its application scenarios imposed thereon, by installing the sighting device on them, their applicable scenarios can be restricted to only civilian scenarios such as hunting, making the shooting equipment unable to use in the military scenario. In the event of a violation of the use restrictions, the sighting device will be directly controlled to self-destroy so as to be disabled permanently, thus effectively improving the safety of the shooting equipment in use.

In some embodiments, after it is determined there is a human target currently being aimed at, the sighting control method based on human detection further comprises:

triggering the sighting device to enter an abnormal sighting mode; or, triggering the sighting device to enter an abnormal sighting mode if the human target keeps being aimed at or the human target remains within a preset range of the aiming mark for over a preset time or a preset number of consecutive frames from the moment that the human target is detected to be aimed at.

The abnormal aiming mode refers to another working mode as opposed to a normal aiming mode of the sighting device, which is used to warn the user of the shooting equipment that the user currently cannot shoot by interrupting the normal aiming function of the sighting device.

When the sighting device implements the sighting control method based on human detection, the sighting device is triggered to automatically enter the abnormal sighting mode when it is determined that there is a human target currently being aimed at according to the target recognition result and the position of the aiming mark in the current scene image. In this way, users of the shooting equipment are prompted by the abnormal sighting mode that the shooting equipment cannot be used for shooting at present, thereby effectively avoiding mistakenly shooting or hurting others in the case of low-illumination or unforeseen circumstances, thus improving the safety of civilian shooting equipment in use. Optionally, when it is determined that there is a human target being currently aimed at, whether the human target keeps being aimed at or the human target remains within a preset range of the aiming mark for over a preset time or a preset number of consecutive frames is further determined; if so, the sighting device is triggered to enter the abnormal sighting mode.

Generally, there is a continuous sighting time before users finally determine to perform shooting after aiming at a target. Considering that the shooting equipment may accidentally aim at the human target at a certain moment during its quick movement, timing is started when it is detected that the shooting equipment aims at a human target at present; In the case of aiming at the human target but not staying at the human target, it indicates that the user does not have the intention of shooting at the human target, the sighting device remains in the normal sighting mode, and the abnormal sighting mode will not be triggered. In this way, the shooting equipment can adapt to using habits of different users and will not cause improper limitations. If the shooting equipment keeps aiming at the human target or the human target remains in the preset range of the aiming mark for over a preset time or a preset number of consecutive frames rather than leaving the human target after it is detected that the shooting equipment aims at the human target, it is determined that the user has the intention of shooting at the human target, and the abnormal sighting mode needs to be triggered.

The preset range of the aiming mark may be an image region determined with the position of the aiming mark as a reference position according to the position of the aiming mark in the current scene image. During the continuous aiming time before the user determines to perform shooting after the shooting equipment aims at the target, the user may perform an adjustment process, and if the shooting equipment keeps aiming at the human target or the human target remains in the preset range of the aiming mark for over a preset time or a preset number of consecutive frames after it is detected that the shooting equipment aims at the human target, it indicates that the user intends to shoot at the human target being currently aimed at.

The preset time may be a time value preset before delivery of the sighting device or a time value that the sighting device obtains from a user setting or user adjustment through the human-machine interface. Alternatively, the preset time may be a length of time that the current user usually maintains aiming at the target, which is calculated by the sighting device based on the historical use records and use habits of the individual user, and the preset time can be corrected and updated according to historical usage records of the user.

The preset number of consecutive frames is generally related to the time duration the user keeps aiming at the target before shooting after the user aims at the target and the image acquisition frequency of the sighting device. For example, the user often keeps aiming at the target for 1 s, and the sighting device acquires 30 frames of images in 1 s, so the preset number M of the consecutive frames may be set to a value less than 30, such as 10.

In the above embodiment, by loading the computer program for implementing the sighting control method based on human detection provided by the embodiments of the application, the current scene image can be analyzed in real time, whether a human target appears in the current sighting image can be recognized in real time, and when it is determined that the sighting device aims at a human target or it is determined that the user intends to shoot at a human target aimed by the sighting device according to the target recognition result and the position of the aiming mark, the sighting device enters the abnormal sighting mode to warn the user that the shooting equipment cannot be used for shooting at present, such that the situation where others are shot or hurt mistakenly in the case of low illumination or unforeseen circumstance can be effectively avoided, thus providing the users of the civilian shooting equipment with greater capability in perceiving the surrounding environment, and greatly reducing the probability of accidents.

It should be noted that, in the use of civilian shooting equipment, due to the complexity of various use scenarios, there may be a variety of unavoidable situations where people appear in the field of view being imaged. For example, in a situation where wolves and shepherds are interspersed with sheep on a pasture, due to the wolf's movement characteristics, the field of view being imaged of the sighting device needs to be large to obtain a current scene image that covers as much image information as possible, so as to analyze and predict the movement characteristics of wolves within the field of view being imaged. In this case, the image of the shepherds may also appear in the corresponding current scene image. With the sighting device installed on the shooting equipment, the sighting control method based on human detection can be performed to calculate to determine in real time whether the shooting equipment is currently aiming at a human target with respect to the current scene image in the current field of view; in the case of a human target currently being aimed at and the intent of shooting at the human target, the sighting device will be triggered automatically to enter the abnormal aiming mode to alert the user to quickly change the aiming target; and in the case of no human target being currently aimed at, the sighting device can keep the normal aiming mode to assist the user in aiming at the wolf that the user originally desires to aim at.

For another example, on the shooting training ground, shooting equipment such as bows and arrows or shooting training guns can also be installed with a sighting device to assist in aiming at the shooting target. With the sighting control method based on human detection performed by the sighting device, a calculation can be made with respect to the current scene image in the current field of view to determine in real time whether the shooting equipment is currently aiming at a human target and the user has the intent to shoot at the human target. If it is determined that there is a human target being currently misaimed at and the shooting action is accurately performed, the sighting device will be triggered automatically to enter the abnormal aiming mode to alert the user to quickly switch the aiming target, ensuring the safety during the training course.

For those shooting equipment originally having no restrictions in its application scenarios imposed thereon, by installing the sighting device on them, their applicable scenarios can be limited to only civilian scenarios such as hunting, making the shooting equipment unable to use in the military scenario, thus effectively enhancing the safety of using the shooting equipment.

In some embodiments, the target recognition with respect to the current scene image may include: the global detection with respect to the current scene image based on the target recognition to recognize the aiming target, the global detection with respect to the current scene image based on the target recognition to recognize the human target, or the local detection with respect to the predetermined area image corresponding to the position of the aiming mark in the current scene image based on the target recognition to recognize the human target, all of which can be realized by known target recognition algorithms or using a deep learning-based approach.

Figure 7:
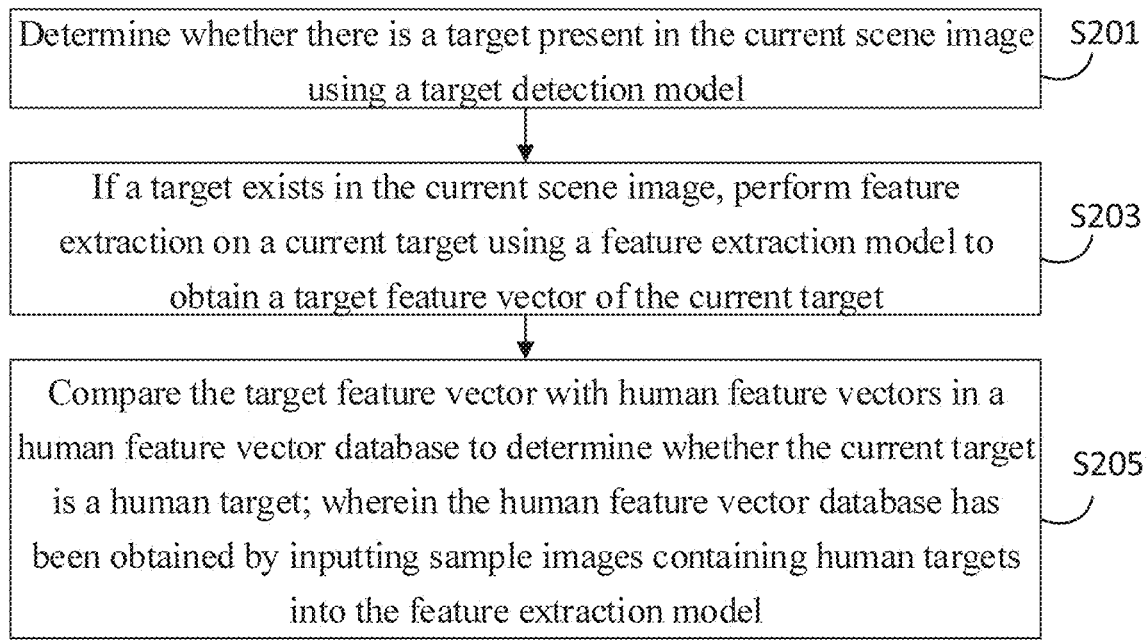
FIG. 7 is a flow chart of human target detection and recognition using an improved target recognition method based on deep learning according to one embodiment.

Optionally, referring to FIG. 7, an improved target recognition method based on deep learning is further provided to detect and recognize a human target and comprises the following steps:

Step S201, determining whether there is a target present in the current scene image using a target detection model;

Step S203, if a target exists in the current scene image, performing feature extraction on a current target using a feature extraction model to obtain a target feature vector of the current target;

Step S205, comparing the target feature vector with human feature vectors in a human feature vector database to determine whether the current target is a human target; wherein the human feature vector database has been obtained by inputting sample images containing human targets into the feature extraction model.

The target detection model and the feature extraction model are individual deep learning models. The target detection model is utilized to perform target detection with respect to the current scene image to determine whether a target exists in the current scene image (at this time, there is no need to recognize the type of the target) and, as such, the target detection model can be implemented by a general target detection model, and only a single category of target needs to be recognized, i.e., only a general target detection is needed to detect whether there is the presence of a target, which has low training requirements and high detection accuracy, can enable more lightweight design, and can be easy to deploy in the sighting device. The feature extraction model extracts features of the current target detected by the target detection model, so as to determine whether the current target is a human target based on a feature extraction result of the current target. As such, the feature extraction model only needs to focus on the feature extraction on the target in the image, which is also conducive to lowering the training requirements, enabling more lightweight design and easier deployment in the sighting device. The feature extraction model also takes sample images containing human targets as an input to perform feature extraction to obtain human feature vectors, so as to construct a human feature vector database.

Optionally, the human feature vector database contains human feature vectors representing different postures, different viewing angles, and different degrees of occlusion.

In a specific example, the feature extraction model is implemented by a pre-trained Openpose feature extractor. A large-scale dataset containing human images is collected to ensure the diversity and representativeness of the human image data, including different human body postures, viewing angles, degrees of occlusion, and environmental backgrounds, etc. Preprocessing, such as, noise removal, grayscaling, normalization, and accurate bounding box labeling, is then performed on the human images to form a specific target dataset. The Openpose feature extractor is trained based on the specific target dataset using a self-learning approach. During the training process, the output of the part before the last fully-connected layer is taken as the human feature vectors, which understandably are of fixed length and highly abstract, and can effectively capture structural information of the human body and its infrared visual features. Finally, these human feature vectors are stored to form a human feature vector database. It is to be understood that each of the human feature vectors in the human feature vector database may be a human sample corresponding to a particular posture, a particular view angle, and a different degree of occlusion.

The target detection model is obtained by training a deep learning model using a training dataset. A general target dataset may be first selected as the training dataset, and a general target detection model is obtained by training the deep learning model using the general target dataset. In an exemplary embodiment, firstly, a large number of real infrared images of a real shooting scene (e.g., a hunting scene) are obtained by actual photographing and other means, and specific positions of the targets are labeled for these images to ultimately form image-label data pairs. A large number of such data pairs are assembled to form the general target dataset required for the training, and the general target dataset is randomly divided into a training set and a testing set by a ratio of 8:2. Next, a convolutional neural network model is constructed, the convolutional neural network model is trained based on the data in the training set, and then the detection accuracy of the convolutional neural network model is verified on the test set, and this process iterates until a preset iteration termination condition is met. When the preset iteration termination condition is met, for example, when the convolutional neural network model achieves an accuracy rate of 95% for the test set, it can be considered to have obtained a general target detection model with high credibility.

The above target detection model and feature extraction model together form a target recognition model. In the actual deployment, i.e., in the application phase of the target recognition model, the current scene image is first used as the input of the target detection model, and whether there is a target in the current scene image is detected in real time by the target detection model, and if there is a target, features of the target are extracted by using the feature extraction model to generate a target feature vector. The target feature vector is compared with the human feature vector database to confirm whether the target detected by the target detection model is a human target.

In the above embodiments, preferred target recognition methods are provided for the detection and recognition of human targets. The inventors of the present application have found in their research that target detection is an important issue in the field of computer vision, which has two main tasks: recognizing target category and determining target location. Convolutional neural network model is an important approach in deep learning algorithms, which does not need any precise mathematical expression between the input and the output. The input and the output are connected by convolutional layers and the complex mapping relationship between the input and the output is learned, so that the convolutional neural network can gain the capability of mapping between the input and the output simply by training the convolutional neural network based on a large number of labeled datasets (inputs, ideal outputs). If there are too many categories of targets to be detected, and the sample data of different target categories has an uneven distribution, the network detection effect will be affected. To this end, this embodiment proposes to train a general target detection model which has only one classification result (i.e., whether or not there is a target), which can reduce the difficulty in collecting the training data and the difficulty in training the model, simplify the structure of the trained model, and reduce the platform arithmetic requirements, making it easier to be deployed in the sighting device. The use of the target detection model in combination with the feature extraction model can realize accurate and efficient recognition of the human target. In other words, the deep learning model used for target detection is typically a large model, which can directly recognize a target category, i.e., recognize a human target, but the training of the model is complicated and imposes a high training data requirement, and when it is deployed in the sighting device, it would cause problems including that the model is too large, the operation speed is slow, and the real-time capability cannot be satisfied. In contrast, the above target recognition method of the present application is a two-step process, which first detects a general target and then performs feature extraction on the target. The corresponding target detection model and feature extraction model used to do so are two small models having low training requirements and capable of meeting the requirement of real-time operation on the sighting device.

It should be noted that the target recognition for the aiming target can also be realized by using the above improved deep learning-based target recognition method under the teachings of this embodiment, which is not repeated herein.

Optionally, step S205 includes:
calculating a distance between the target feature vector and each of the human feature vectors in the human feature vector database, and determining whether the current target is a human target based on the distance.

Comparing the target feature vector with the human feature vector database is equivalent to comparing the target feature vector with the human feature vectors representing different postures, different view angles and different degrees of occlusion in the human feature vector database. The distance, such as an Euclidean distance or a cosine similarity, between the target feature vector and each of the human feature vectors is calculated to obtain a confidence degree that the target is a human target, and if the confidence degree is greater than a set threshold, the target is considered to be a human target and the human target is framed at its corresponding position; otherwise, the target is considered to be a non-human target and no processing may be performed on the target.

In the above embodiment, by extracting feature vectors of the target and constructing a human feature vector database using a specialized feature extraction model, and by judging the similarity between the feature vectors by calculating the distance between the vectors, it is made possible to achieve a more rapid and accurate judgment of whether the aiming mark in the current scene image is currently aligned with the human target.

In some embodiments, the abnormal aiming mode comprises at least one of the following:
providing a warning notice: the warning notice includes at least one of an audible warning, a light warning, a graphic warning in a display screen, and a target highlighting warning;
providing an abnormal display warning: the abnormal display includes at least one of disappearing of the aiming mark, offsetting of the aiming mark, a black screen, a splash screen, and jittering of the display screen;
shutdown of a system;
providing a warning notice and starting timing, and providing an abnormal display warning or shutting down the system if the timing reaches a threshold and the aiming mark is currently still aligned with a human target.

The abnormal aiming mode of the sighting device may be in various forms that are distinguished from the normal aiming mode and capable of constraining the current aiming and shooting operation of the user of the shooting equipment. On the premise of not conflicting with each other, the above-mentioned various means such as, providing warning notice, providing abnormal display warning, and shutting down, can be used in any combination to achieve simultaneous alerting by multiple means.

In a possible specific example, in the process of the sighting control method based on human detection performed by the sighting device, upon confirming that there is a human target currently being aimed at, the sighting device enters the abnormal aiming mode. In the abnormal aiming mode, firstly, a warning notice is provided and timing starts. If the cumulative time of the warning notice reaches a threshold, for example, the warning notice lasts for 3 seconds, and the determining result with respect to the current scene image captured in real time is still confirming that the aiming mark is currently aligned with a human target, then the abnormal display warning is provided or the sighting device is directly controlled to shut down, directly restricting the user from continuing to use the normal aiming function of the sighting device.

In some embodiments, an inertial sensor is arranged in the sighting device; in S105, detecting whether a shooting action occurs comprises:
determining whether a shooting action occurs by analyzing sensor data acquired in real time by the inertial sensor.

The inertial sensor is a sensor for detecting and measuring acceleration, tilt, shock, vibration, rotation and motion in multiple degrees of freedom (DOF). When a shooting action is performed by the shooting equipment, an acceleration or vibration that cannot be artificially created will be generated on the shooting equipment together with the sighting device mounted thereon, so whether a shooting action occurs is performed by the shooting equipment can be determined by analyzing sensor data acquired by the inertial sensor on the sighting device.

In one optional example, the inertial sensor comprises an accelerometer and/or a gyroscope, and determining whether a shooting action occurs by analyzing sensor data acquired in real time by the inertial sensor comprises:
analyzing sensor data acquired in real time by the accelerometer and/or the gyroscope to determine whether the sensor data matches a shooting behavior template to determine whether a shooting action occurs, wherein the shooting behavior template is generated by analyzing first sensor data and second sensor data, respectively corresponding to historical shooting actions, acquired by the accelerometer and/or the gyroscope.

The shooting behavior template is a data feature capable of determining current sensor data is sensor data corresponding to a shooting action. For example, when a shooting action occurs at the shooting equipment, the shooting equipment together with the slighting device thereon will generate an acceleration that cannot be artificially made, an acceleration threshold can be determined according to data acquired by the accelerometer when historical shooting actions were performed, and once data acquired by the accelerometer exceeds the acceleration threshold, it can be determined that a shooting action occurs. Here, the acceleration threshold can be used as the shooting behavior template. For another example, when a shooting action occurs at the shooting equipment, the shooting equipment together with the slighting device thereon will generate a vibration that cannot be artificially made, a vibration threshold formed by vibration frequency, vibration amplitude and angular displacement can be determined by analyzing data acquired by the gyroscope when historical shooting actions were performed, and once data acquired by the gyroscope exceeds the vibration threshold, it can be determined that a shooting action occurs. Here, the vibration threshold formed by the vibration frequency, the vibration amplitude and the angular displacement may be used as the shooting behavior template.

Optionally, the inertial sensor of the sighting device comprises both an accelerometer and a gyroscope, the shooting behavior template comprises an acceleration threshold and a vibration threshold, and when whether a shooting action occurs is determined by analyzing sensor data acquired by the inertial sensor, it is determined that a shooting action occurs on condition that sensor data acquired by the accelerator and the gyroscope satisfies both the acceleration threshold and the vibration threshold in the shooting behavior template. In this way, whether a shooting action occurs can be determined more accurately.

In the above embodiment, the accelerator and the gyroscope are both hardware sensors, such that the accuracy, timeliness and reliability of data acquisition can be effectively guaranteed; the shooting behavior template is formed by analyzing sensor data corresponding to historical shooting actions, and sensor data is compared with data features forming the shooting behavior template, such that whether a shooting action occurs can be determined accurately and efficiently.

In some embodiment, an inertial sensor is arranged in the sighting device; in S105, detecting whether a shooting action occurs comprises:

determining whether a shooting action occurs by analyzing sensor data acquired in real time by the inertial sensor and by determining whether the human target satisfies a preset downward deviation condition with respect to the aiming mark according to multiple consecutive frames of the current scene image.

Analyzing sensor data acquired in real time by the inertial sensor may be the same as that in the above embodiment. For example, the inertial sensor may comprise an accelerometer and/or a gyroscope, and whether a shooting action occurs is determined according to sensor data acquired by the inertial sensor, specifically according to whether sensor data acquired by the accelerator exceeds an acceleration threshold, or whether sensor data acquired by the gyroscope exceeds a vibration threshold formed by vibration frequency, vibration amplitude and vibration threshold, or whether sensor data acquired by the accelerometer and the gyroscope exceeds an acceleration threshold and an vibration threshold. Further, in this embodiment, the sighting control method based on human detection further comprises: determining whether a shooting action occurs in conjunction with an image analysis algorithm, which determines whether the aiming mark satisfies a preset downward deviation condition according to a change of the position of the human target in multiple consecutive frames of the current scene image to thereby determine whether a shooting action occurs.

In the above embodiment, the sighting device determines whether a shooting action occurs when there is a human target currently being aimed at by means of a combination of hardware sensors and a software algorithm. The dual judgment mechanism based on combined hardware and software can effectively guarantee the accuracy of the judgement result, and avoid self-destroy of the sighting device caused by misjudgement, thus avoiding user loss.

Optionally, determining whether a shooting action occurs by analyzing sensor data acquired in real time by the inertial sensor and by determining whether the human target satisfies a preset downward deviation condition with respect to the aiming mark according to multiple consecutive frames of the current scene image comprises:

analyzing sensor data acquired in real time by the inertial sensor and determining whether the sensor data matches a shooting behavior template; and while it is determined that the sensor data of the inertial sensor matches the shooting behavior template, determining whether the human target satisfies a quick downward deviation and disappearing condition with respect to the aiming mark according to a change of the position of the human target with respect to the aiming mark in the multiple consecutive frames of the current scene image so as to determine whether a shooting action occurs.

When the aiming mark is aligned with a target, it indicates that the shooting equipment aims at the target within the current field of view of the shooting equipment. When the shooting equipment keeps aiming at the target, the target will remain stable in the current field of view; when a shooting action occurs, the shooting equipment will produce a great vibration together with the aiming equipment, and the target in the field of view will instantly produce a great deviation from the aiming mark (e.g. the center of the field of view). As such, whether a shooting action occurs can be determined by image analysis, for example, whether a shooting action occurs can be determined according to whether the target leaves the field of view with a high acceleration in a coordinate system of the field of view, that is, whether a shooting action occurs is determined according to whether the human target in the image satisfies the quick downward deviation and disappearance condition.

In this embodiment, in the dual judgment mechanism used by the sighting device to determine whether a shooting action occurs when the sighting device aims at a human target by means of a combination of hardware sensors and software algorithm, after it is first determined that sensor data acquired by the inertial sensor matches the shooting behavior template, multiple consecutive frames of image synchronously acquired with the acquisition of the sensor data are then analyzed, and whether the human target satisfies the quick downward deviation and disappearance condition is determined according to the change in the position of the human target with respect to the aiming mark in the multiple consecutive frames of image so as to determine whether a shooting action occurs. The amount of the consecutive frames may be determined according to an image frame acquisition rate of the sighting device in one second and an operation time of the shooting action, which is generally much less than the amount of image frames acquired by the sighting device in one second, such as 5-6 frames.

In the above embodiment, in a case where the sensor data acquired by the inertial sensor matches the shooting behavior template, an image analysis algorithm for determining whether the human target satisfies the quick downward deviation and disappearance condition is triggered synchronously, and the determination made by the software algorithm is used as an auxiliary and confirmation for the determination made by the hardware sensor, to reduce the pressure of the algorithm and effectively guarantee the accuracy of the determination result to avoid self-destroy of the sighting device caused by misjudgement, thus avoiding user loss.

In some embodiment, the sighting device comprise a fuse element connected between a power module and a main control module. In S107, controlling the sighting device to self-destroy comprises:

outputting a self-destroy current-rise instruction to control the power module to output a self-destroy current causing the fuse element to melt to form an open circuit.

Self-destroy of the sighting device means that the sighting device is disabled permanently. In a case where the sighting device aims at a human target and the user operates the shooting equipment to perform a shooting action, the sighting device will self-destroy automatically to be disabled permanently, so as to restrict the user from continuing to use the sighting device to assist in aiming and shooting. This is also a constraint on the application scenario of the sighting device used by the user, so as to restrict the sighting device to be applied to shooting equipment for civilian scenarios only. In a specific example, in a self-destroy program of the sighting device, when a control chip outputs a control signal (low-level signal) to a control terminal of a switch control element of a high-power heating device to close the on-off control element, the high-power heating device starts to work, the current rises sharply to form a self-destroy current causing the fuse element to melt to form an open circuit due to the excessive current, so that power supply to the main control chip is cut off, the system is completely powered down, and thus the sighting device is disabled permanently. Of course, the sighting device can also be disabled permanently in other ways, and the application has no specific limitation in this aspect.

In some embodiments, the sighting device further comprises a built-in GPS module, and S107 of the sighting control method based on human detection further comprises:
if a shooting action occurs, sending warning information comprising current position data to a target terminal or a server by the GPS module.

When there is a human target being aimed at and the user operates the shooting equipment to perform a shooting action, the current position data will be recorded and sent to the target terminal or server by the sighting device, such that the time and position of the shooting action are recorded, and the legality of historical use of the shooting equipment can be checked if necessary. Recording data is also a way of constraining the application scenario of the sighting device used by the user, so as to restrict the sighting device to be applied to shooting equipment for civilian scenarios only.

In another aspect, the application provides a computer program product, comprising a computer program being executable by a processor to implement the sighting control method based on human detection according to any one embodiment of the application.

Figure 8:
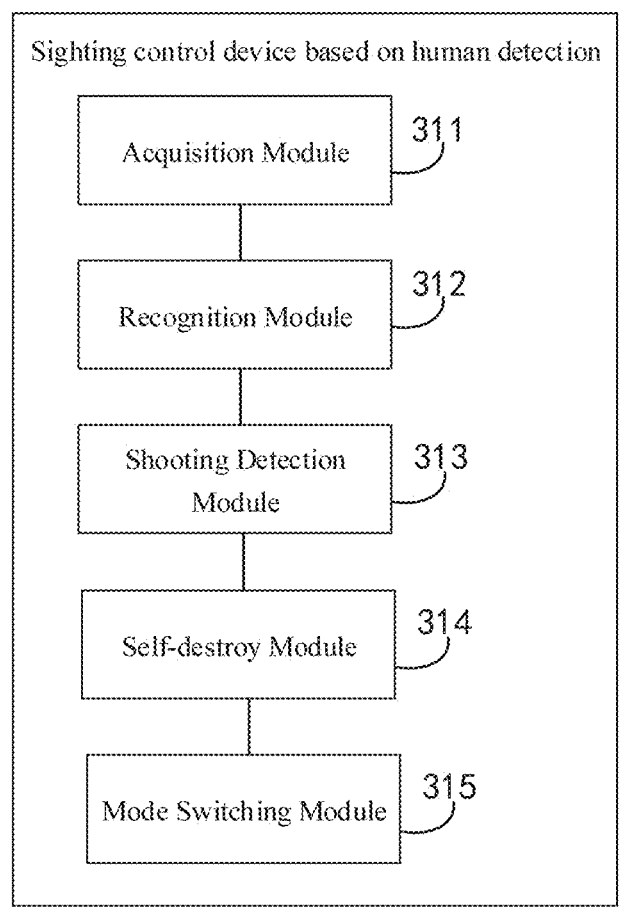
FIG. 8 is a structural diagram of a sighting control device based on human detection according to one embodiment.

In the computer program product, the program modular architecture of a computer program for performing the steps of the method may be implemented as a sighting control device based on human detection. Referring to FIG. 8, the sighting control device based on human detection comprises: an acquisition module 311 for acquiring a current scene image in the current field of view of a sighting device; a recognition module 312 for determining whether there is a human target currently being aimed at according to a target recognition result of the current scene image and a position of an aiming mark in the current scene image; a shooting detection module 313 for detecting whether a shooting action occurs if it is determined that there is a human target currently being aimed at; and a self-destroy module 315 for controlling the sighting device to self-destroy if a shooting action occurs.

Optionally, the sighting control device based on human detection further comprises a mode switching module 314 for triggering the sighting device to enter an abnormal sighting mode upon determining that there is a human target currently being aimed at, or triggering the sighting device to enter an abnormal sighting mode if the human target keeps being aimed at or remains within a preset range of the aiming mark for over a preset time or a preset number of consecutive frames from the moment the human target is detected to be aimed at.

Optionally, an inertial sensor is arranged in the sighting device, and the shooting detection module 313 is configured to determine whether a shooting action occurs by analyzing sensor data acquired in real time by the inertial sensor.

Optionally, the inertial sensor comprises an accelerometer and/or a gyroscope, and the shooting detection module 313 is configured to analyze sensor data acquired in real time by the accelerometer and/or the gyroscope to determine whether the sensor data matches a shooting behavior template so as to determine whether a shooting action occurs. The shooting behavior template is generated by analyzing first sensor data and second sensor data, respectively corresponding to historical shooting actions, acquired by the accelerometer and/or the gyroscope.

Optionally, an inertial sensor is arranged in the sighting device, and the shooting detection module 313 is configured to determine whether a shooting action occurs, by analyzing sensor data acquired in real time by the inertial sensor and by determining whether the human target satisfies a preset downward deviation condition with respect to the aiming mark according to multiple consecutive frames of the current scene image.

Optionally, the shooting detection module 313 is specifically configured to analyze sensor data acquired in real time by the inertial sensor to determine whether the sensor data matches a shooting behavior template, and when the sensor data acquired by the inertial sensor matches the shooting behavior template, determine whether the human target satisfies a preset downward deviation and disappearance condition according to a change of the position of the human target with respect to the aiming mark in multiple consecutive frames of the current scene image, so as to determine whether a shooting action occurs.

Optionally, the sighting device comprise a fuse element connected between a power module and a main control module, and the self-destroy module 315 is configured to output a self-destroy current-rise instruction, controlling the power module to output a self-destroy current causing the fuse element to melt to form an open circuit.

It should be noted that the process of implementing the sighting control method based on human detection by the sighting control device based on human detection provided by the above embodiment is described in conjunction with the above program modules by way of an example. In actual use, this process can be implemented by different program modules as needed, that is, the internal structure of the sighting control device based on human detection can be divided into different program modules to complete all or part of the steps of the sighting control method. In addition, the sighting control device based on human detection provided by the above embodiment and the sighting control method based on human detection belong to the same concept, and the specific implementation process of the sighting control device can be understood with reference to the embodiments of the method and will not be repeated here.

Figure 9:
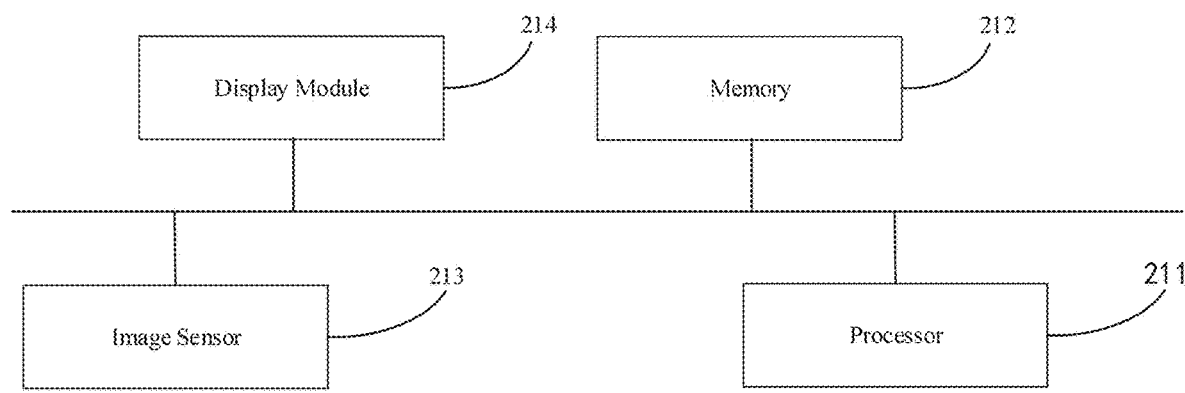
FIG. 9 is a structural diagram of a sighting device according to one embodiment.

In another aspect, the application provides a sighting device. Referring to FIG. 9 which is a schematic diagram of a hardware structure of the sighting device, the sighting device comprises a processor 211, a memory 212 connected to the processor 211, an image sensor 213 and a display module 214. The image sensor 213 is configured to acquire a current scene image in a current field of view and sending the current scene image to the processor 211 and the display module 214. The display module 214 is mainly configured to display information under the current aiming mode, mainly displaying the current scene image and an aiming mark. The memory 212 stores therein a computer program for implementing the sighting control method based on human detection provided by any one embodiment of the application, such that when the corresponding computer program is executed by the processor, the steps of the sighting control method based on human detection provided by any one embodiment of the application are performed. The sighting device loaded with the corresponding computer program has the same technical effects as the corresponding embodiments of the method, explanations of which are not repeated herein.

In another aspect, the application further provides a computer-readable storage medium with a computer program stored therein. The computer program is executable by a processor to implement the process of the sighting control method based on human detection provided by any of the embodiments above, which can achieve the same technical effects, details of which are not repeated herein. The computer-readable storage medium may be, for example, a read-only memory (ROM), a random-access memory (RAM), a magnetic disk or an optical disk.

It should be noted that in this disclosure, the terms "include", "comprise", or any other variations thereof, are intended to cover non-exclusive inclusion, so that a process, method, article of manufacture, or apparatus comprising a set of elements includes not only those elements listed but also other elements that are not expressly listed or that are inherent to such process, method, article or apparatus. Without further limitation, the fact that an element is defined by the phrase "including a . . . " does not exclude the existence of another same element in the process, method, article of manufacture, or device that includes that element.

By the above description of the embodiments, it is clear to people skilled in the art that the method of the above embodiments can be realized by means of software in combination with the necessary general hardware platform, or by means of hardware, but in many cases the former is the preferred implementing manner. Based on this understanding, the technical solution of the present application may be embodied essentially in the form of a computer software product, which is stored on a storage medium (e.g., ROM/RAM, magnetic disk, CD-ROM), including a number of instructions for enabling a terminal (e.g., a mobile phone, a computer, a server, an infrared thermal imager or a network device, etc.) to carry out the method described in the various embodiments of the present invention.

The foregoing are only specific embodiments of the present disclosure, but the scope of the present disclosure is not limited thereto. Various changes or substitutions that may be readily conceivable by those skilled in the art within the scope of the technology disclosed in the present disclosure shall fall into the scope of the present disclosure. Therefore, the scope of the present disclosure shall be determined based on the appended claims.

What is claimed is:

1. A sighting control method based on human detection, comprising:
    acquiring a current scene image in a current field of view of a sighting device;
    determining whether there is a human target currently being aimed at based on a target recognition result of the current scene image and a position of an aiming mark in the current scene image;
    detecting whether a shooting action occurs if it is determined that there is a human target currently being aimed at; and
    controlling the sighting device to self-destroy if a shooting action occurs.

2. The sighting control method based on human detection according to claim 1, wherein, before detecting whether a shooting action occurs if it is determined that there is a human target currently being aimed at, the sighting control method comprises:
    triggering the sighting device to enter an abnormal sighting mode; or
    triggering the sighting device to enter an abnormal sighting mode if the human target keeps being aimed at or the human target remains within a preset range of the aiming mark for over a preset time or a preset number of consecutive frames from the moment of the human target being currently detected to be aimed at.

3. The sighting control method based on human detection according to claim 1, wherein an inertial sensor is arranged in the sighting device, and detecting whether a shooting action occurs comprises:
    determining whether a shooting action occurs by analyzing sensor data acquired in real time by the inertial sensor.

4. The sighting control method based on human detection according to claim 3, wherein the inertial sensor comprises an accelerometer and/or a gyroscope, and determining whether a shooting action occurs by analyzing sensor data acquired in real time by the inertial sensor comprises:
    analyzing sensor data acquired in real time by the accelerometer and/or the gyroscope to determine whether the sensor data matches a shooting behavior template to determine whether a shooting action occurs, wherein the shooting behavior template is generated by analyzing first sensor data and second sensor data, respectively corresponding to historical shooting actions, acquired by the accelerometer and/or the gyroscope.

5. The sighting control method based on human detection according to claim 1, wherein an inertial sensor is arranged in the sighting device, and detecting whether a shooting action occurs comprises:
    determining whether a shooting action occurs, by analyzing sensor data acquired in real time by the inertial sensor and by determining whether the human target satisfies a preset downward deviation condition with respect to the aiming mark according to multiple consecutive frames of the current scene image.

6. The sighting control method based on human detection according to claim 5, wherein, determining whether a shooting action occurs, by analyzing sensor data acquired in real time by the inertial sensor and by determining whether the human target satisfies a preset downward deviation condition with respect to the aiming mark according to multiple consecutive frames of the current scene image, comprises:
    analyzing sensor data acquired in real time by the inertial sensor to determine whether the sensor data matches a shooting behavior template; and
    while it is determined that the sensor data of the inertial sensor matches the shooting behavior template, determining whether the human target satisfies a quick downward deviation and disappearing condition with respect to the aiming mark according to a change of the position of the human target with respect to the aiming mark in the multiple consecutive frames of the current scene image so as to determine whether a shooting action occurs.

7. The sighting control method based on human detection according to claim 1, wherein the sighting device comprises a fuse element connected between a power module and a main control module, and controlling the sighting device to self-destroy comprises:
    outputting a self-destroy current-rise instruction to control the power module to output a self-destroy current causing the fuse element to melt to form an open circuit.

8. The sighting control method based on human detection according to claim 1, wherein determining whether there is a human target currently being aimed at comprises:
    performing a global target detection and recognition with respect to the current scene image based on a target recognition algorithm, to recognize and mark all human targets contained in the current scene image;

based on a position of the aiming mark in the current scene image, determining whether the position of the aiming mark overlaps a position of any one of the human targets that have been marked; and determining whether there is a human target being currently aimed at based on whether a position of the human target overlaps with a position of the aiming mark.

9. The sighting control method based on human detection according to claim 1, wherein determining whether there is a human target currently being aimed at comprises:

determining a predetermined area image with a position of the aiming mark in the current scene image as a reference position;

performing a local target detection and recognition with respect to the predetermined area image based on a target recognition algorithm to determine whether there is a human target within the predetermined area image within a set time; and determining whether there is a human target being currently aimed at based on whether there is a human target present within the predetermined area image within a set time.

10. The sighting control method based on human detection according to claim 1, wherein the target recognition is a deep learning-based target recognition method, comprising:

determining whether there is a target present in the current scene image using a target detection model;

if a target exists in the current scene image, performing feature extraction on a current target using a feature extraction model to obtain a target feature vector of the current target;

comparing the target feature vector with human feature vectors in a human feature vector database to determine whether the current target is a human target; wherein the human feature vector database has been obtained by inputting sample images containing human targets into the feature extraction model.

11. The sighting control method based on human detection according to claim 10, wherein comparing the target feature vector with human feature vectors in a human feature vector database to determine whether the current target is a human target comprises:

calculating a distance between the target feature vector and each of the human feature vectors in the human feature vector database, and determining whether the current target is a human target based on the distance.

12. A sighting device comprising:

a memory configured to store a computer program therein;

a processor configured to execute the computer program to implement the sighting control method based on human detection according to claim 1;

an image sensor configured to acquire a current scene image in a current field of view; and a display module configured to display the current scene image and an aiming mark.

13. The sighting device according to claim 12, further comprising an inertial sensor configured to acquire, in real time, sensor data to be analysed to determine whether a shooting action occurs.

14. The sighting device according to claim 13, wherein the inertial sensor comprises at least one of an accelerometer and a gyroscope.

15. The sighting device according to claim 12, further comprising a fuse element connected between a power module and a main control module, the processor further configured to output a self-destroy current-rise instruction to control the power module to output a self-destroy current causing the fuse element to melt to form an open circuit.

16. A computer-readable storage medium, wherein a computer program is stored in the computer-readable storage medium, and the computer program is executable by a processor to implement the sighting control method based on human detection according to claim 1.

* * * * *